(12) United States Patent
Geiger

(10) Patent No.: US 6,331,030 B1
(45) Date of Patent: Dec. 18, 2001

(54) VEHICLE DOOR WITH ANTI-FLUTTER CATCH ASSEMBLY, AND METHOD OF PREVENTING VEHICLE DOOR FLUTTER

(75) Inventor: Charles Wayne Geiger, La Crescenta, CA (US)

(73) Assignee: Hehr International, Los Angeles, CA (US)

( * ) Notice: Subject to any disclaimer, the term of this patent is extended or adjusted under 35 U.S.C. 154(b) by 0 days.

(21) Appl. No.: 09/637,802

(22) Filed: Aug. 11, 2000

Related U.S. Application Data
(60) Provisional application No. 60/148,910, filed on Aug. 13, 1999.

(51) Int. Cl.[7] ............................... B60J 5/10; E05B 65/06; E05C 19/02
(52) U.S. Cl. .................................... 296/146.9; 296/146.1; 49/483.1; 49/394
(58) Field of Search ........................... 296/146.9, 146.11, 296/146.1; 49/483.1, 394; 292/DIG. 73; 16/DIG. 6

(56) References Cited

U.S. PATENT DOCUMENTS 5,951,098 * 9/1999 Waldeck et al. ................ 296/190.11
6,101,853 * 8/2000 Herr ...................................... 70/109
6,139,081 * 10/2000 Lemieux .............................. 296/37.7
6,247,744 * 6/2001 Townsend et al. ............. 296/146.11

\* cited by examiner

*Primary Examiner*—Stephen T. Gordon
*Assistant Examiner*—Greg Blankenship

(57) ABSTRACT

A recreational vehicle having a door that has a leading edge with a sloped upper portion and hinges on a straight lower portion, such that the upper portion of the door is subject to fluttering under the forces encountered in use, and a catch assembly disposed between the vehicle and the door on the sloped upper portion near the upper end of the door. The catch assembly is of the type that engages as an incident to coming together as the door is closed, and is disengaged by a predetermined approximate opening force greater than the fluttering forces to be encountered in use. The preferred catch assembly comprises a leaf spring with a detent bend in a free end engageable with a catch member having a ramp for loading the spring and a detent recess into which the bend snaps on closing, and reverse-camming surfaces on the detent and the catch member for disengaging the catch for opening of the door. An important feature is the method of preventing door flutter in the foregoing manner.

16 Claims, 2 Drawing Sheets

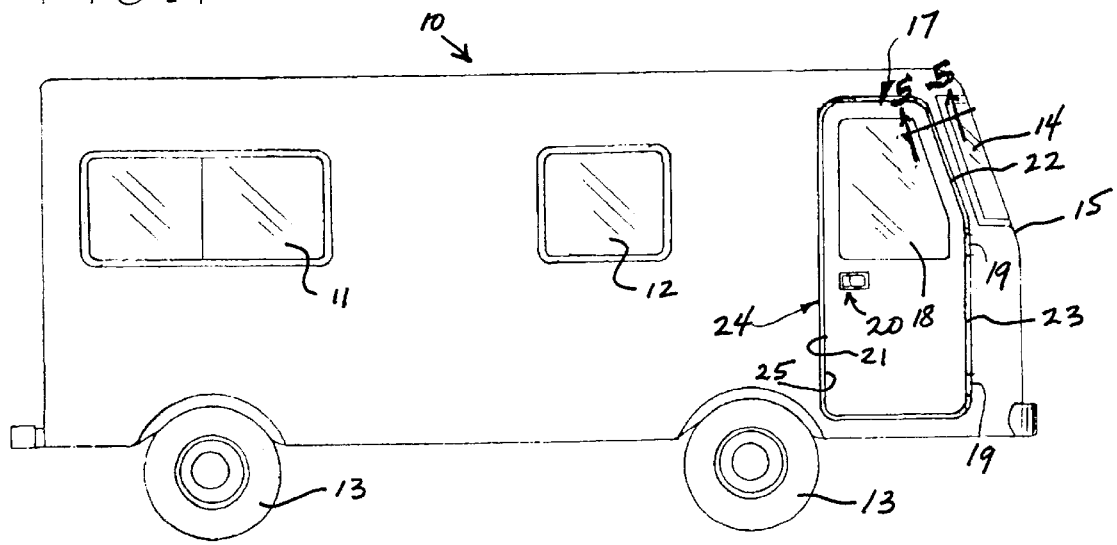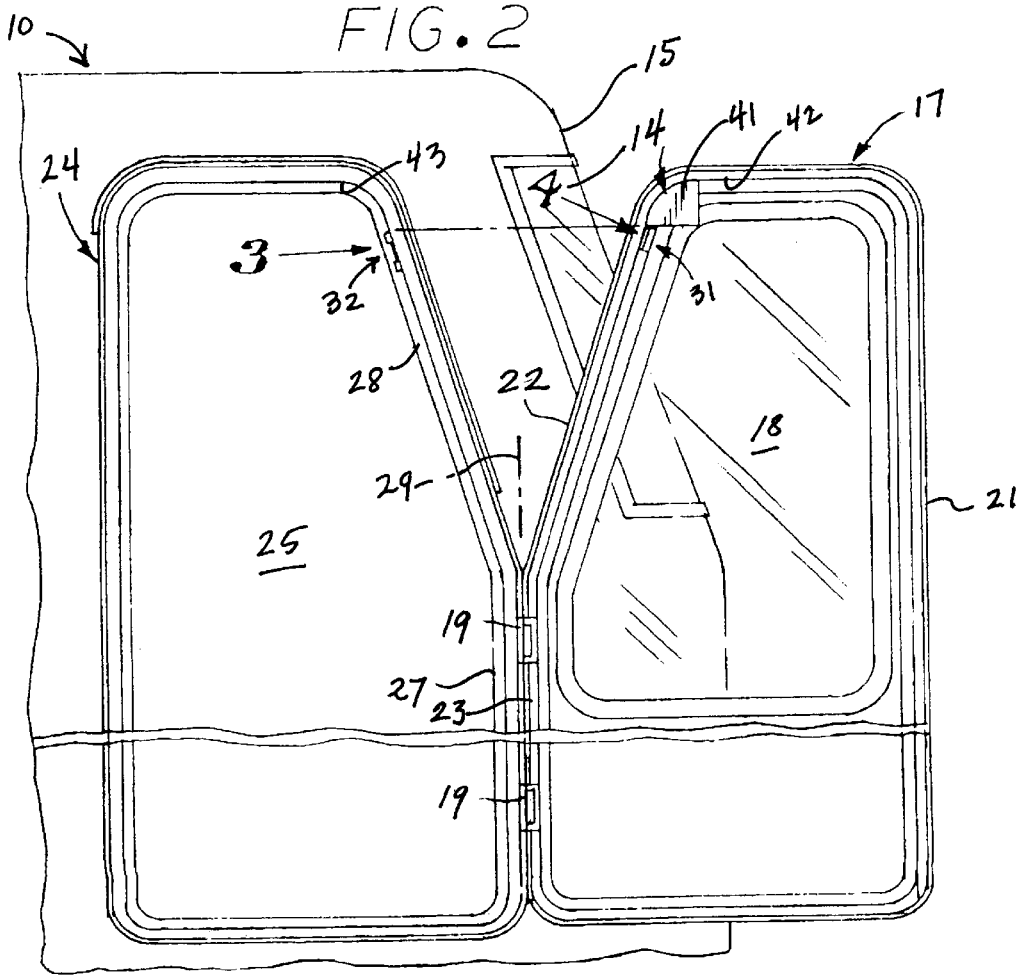

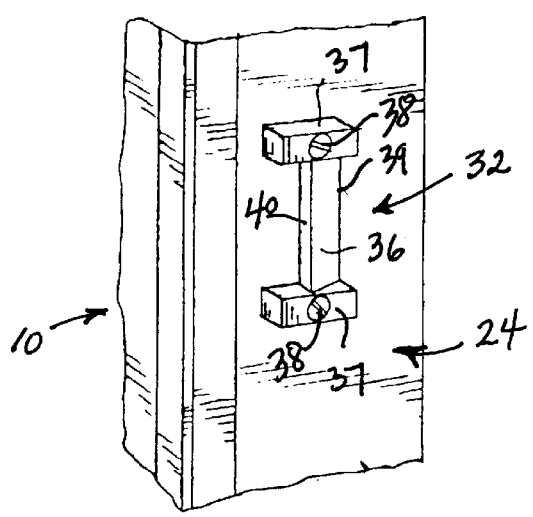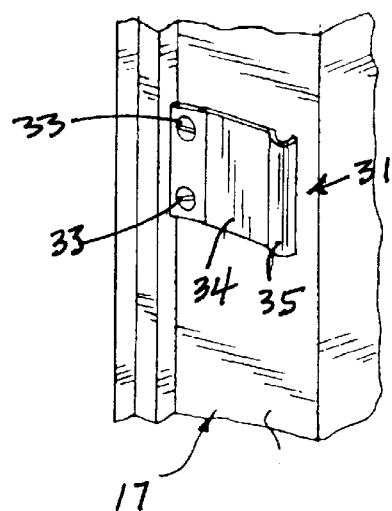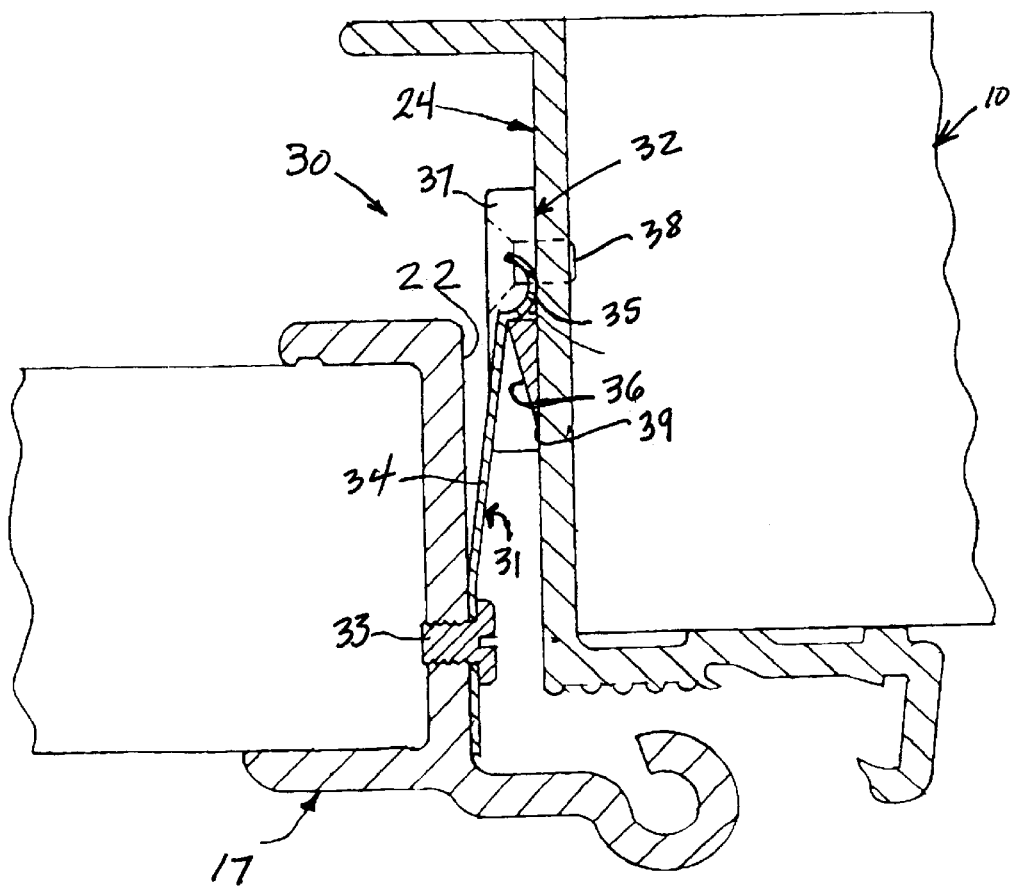

VEHICLE DOOR WITH ANTI-FLUTTER CATCH ASSEMBLY, AND METHOD OF PREVENTING VEHICLE DOOR FLUTTER

REFERENCE TO PRIOR PROVISIONAL APPLICATION

This application claims the benefit of prior copending provisional application No., 60/148,910, filed Aug. 13, 1999.

BACKGROUND OF THE INVENTION

This invention relates to the securing of vehicle doors in the closed position, and has particular reference to the securing of an irregularly shaped door for a vehicle such as a motor home or other recreational vehicle (herein referred to as an "RV").

In many RV's, there is a side entry door near the front of the vehicle with a front or leading side of the door following the slope of the windshield. Such doors typically are hinged on the door frame along their leading sides, on the lower portion of the door that is straight, with the top of the hinge or hinges about midway between the top and bottom of the door. The trailing or free side of the door is latched to the frame in a conventional manner, usually by a handle-operated latch assembly, but the upper approximately one-half of the leading edge of the door is not supported, and thus is subject to fluttering while the vehicle is in motion at highway speeds.

Such fluttering can be the result of both vehicle vibration and external influences such as those caused by wind and varying air pressures which can produce substantial fluttering forces on the door. The hinges and the door latch hold the lower portion of the door securely in place, but the upper front portion does not lie along the hinge axis, is not directly hinged to the vehicle and therefore is essentially loose in the door frame so as to be particularly vulnerable to the fluttering forces.

Efforts that have been made by RV manufacturers to solve this problem include reinforcing the upper portions of such doors to make them stiffer so that the support of the hinged lower portions also will support the loose upper portions. This is relatively expensive and is a less than completely satisfactory solution, and many doors of this kind continue to be used, and continue to be subject to this problem.

SUMMARY OF THE INVENTION

The present invention overcomes the foregoing fluttering problem in an effective manner that is simple and relatively inexpensive and does not interfere with or complicate the normal opening and closing of the vehicle door. To these ends, the invention utilizes a simple retention catch assembly and positions that assembly strategically between the upper portion of the door and the vehicle door opening, to be latched and unlatched automatically as an incident to normal closing and opening of the door and to hold the loose upper portion securely, but releasably, in place in the door opening during normal vehicle operation. The opening force required to overcome the holding force of the catch assembly is made great enough to withstand the fluttering forces that are encountered during normal vehicle operation, but not so great as to interfere with conventional opening of the door for access to the vehicle.

In the preferred embodiment shown herein, the catch assembly is mounted close to the upper end of the sloped upper edge of the door and comprises a catch spring member having a yieldable detent that is resiliently urged to a latching position, and a catch member having a ramp with a detent recess at the end of the ramp, positioned to cam the detent out of the latching position during closing and to permit the detent to become engaged with the catch member in the detent recess when the door is closed. The two members of the preferred catch assembly have surfaces that are opposed, when latched, and which provide a reverse ramp for camming the detent out of the recess in response to opening of the door in the normal manner, that is, by pulling on the door handle.

As will be described in more detail hereinafter, the preferred catch assembly comprises an elongated leaf spring fixed at one end, herein on the door edge, with an arcuate bend forming the detent at its free end, and a wedge-shaped ramp secured to the adjacent edge of the vehicle frame, in the path followed by the detent during closing. A shoulder at the inner end of the ramp forms one side of the detent opening in which the arcuate detent is engaged when the door is closed, and the arcuate bend cooperates with this shoulder in providing the reverse ramp for disengaging the catch as the door is opened.

The invention also resides in the method of preventing fluttering of a vehicle door of the type described above, including the correlation of the holding force of the catch and the maximum fluttering forces to be encountered during normal operation, as well as the strategic positioning of the catch assembly for optimum results.

Other detailed aspects and advantages of the invention will become apparent from the following detailed description, taken in conjunction with the accompanying drawings.

BRIEF DESCRIPTION OF THE DRAWINGS

FIG. 1 is a diagrammatic side elevational view showing a representative recreational vehicle having a door of the type for which the present invention was made, the door being shown in the closed position;

FIG. 2 is an enlarged fragmentary view showing a portion of FIG. 1 with the door shown in the open position and with a central portion broken away for compactness of illustration, a locator template being shown for positioning the catch assembly;

FIG. 3 is a further enlarged fragmentary perspective view taken in the direction of the arrow 3 in FIG. 2;

FIG. 4 is a further enlarged fragmentary perspective view taken in the direction of the arrow 4 in FIG. 2; and FIG. 5 is a further enlarged fragmentary cross-sectional view taken through the catch assembly when the door is closed and the assembly is latched, generally in a plane lying along the line 5—5 in FIG. 1.

DETAILED DESCRIPTION

As shown in the drawings for purposes of illustration, the invention is incorporated in a representative recreational vehicle ("RV"), indicated generally by the reference number 10 in FIGS. 1 and 2. The RV is shown as having conventional side windows 11 and 12, wheels 13 and a windshield 14 of the kind that is set into a sloped upper front 15 of the vehicle. As is typical in such RV's, an upright door 17 is provided on the passenger side, just behind the windshield, for access to the interior and the front passenger seat. This door may have a window 18, hinges 19 and a handle assembly 20 which operates a latch (not shown) between the handle assembly and the trailing edge 21 of the door.

The door is positioned close to the windshield 14 in the sloped front portion of the RV, and the upper front edge also is sloped, at 22, to lie close to the windshield. The hinges 19 are located on the straight lower portion 23 of the leading edge of the door, this typically constituting approximately one-half the height of the door. The handle assembly 20 is located approximately midway along the trailing edge 21 of the door, to be conveniently accessible from the outside for use in unlatching the door and pulling it open. This location of the hinges and the handle assembly leaves the upper almost one-half of the door fitted loosely in the door opening, without connection to the vehicle except through its joinder to the lower portion of the door.

The door 17 typically is mounted in a door frame 24 that is set into the sidewall of the vehicle and defines a door opening 25 that corresponds in size and shape to the size and shape of the door, so as to receive the door with a close fit. Thus, the door frame also has a straight lower leading side at 27 and a sloping upper portion at 28. The hinges 19 are mounted on the lower portion 27, and define a substantially vertical hinge axis, as indicated at 29 in FIG. 2.

In accordance with the present invention, the vehicle door 17 is provided with an anti-flutter catch assembly, indicated generally at 30 in FIG. 5, that is strategically located on the upper portion of door to hold the door closed against the maximum fluttering forces that are to be encountered in normal operation of the vehicle 10, and to be engaged and disengaged automatically as an incident to the normal closing and opening of the door, without interfering with such normal operation. For these purposes, the catch assembly 30 has two catch members 31 and 32 that are engageable automatically as an incident to moving into contact with each other, and disengageable in response to a predetermined opening force that is greater than the normal maximum level of fluttering forces, and is positioned between the door and the door fame to become engaged automatically as an incident to closing of the door. Optimally, the catch assembly is located near the upper end of the sloped edge 22 of the door, and preferably just below the top of the door, as shown most clearly in FIG. 2.

The presently preferred catch assembly 30 is of the leaf-spring type in which one catch element 31 is an elongated leaf spring that is secured at one end to the edge of the door, for example, by two screws 33 that are threaded into holes in the edge of the door, as shown in FIGS. 4 and 5, and has an arm 34 that is inclined inwardly and away from the door edge, toward the door frame. The free end portion of this spring is formed with an arcuate detent bend 35, convex on the side facing the door frame, for sliding engagement with the second catch member 32. This member is an H-shaped piece having a crossbar 36 extending between two mounting lugs 37 which are secured to the door frame 24 in the door opening by two fasteners, herein two screws 38 that are threaded into holes in the door frame. The crossbar of this catch member is wedge-shaped in cross-section, as shown in FIG. 5, with its thinner edge 39 facing outward and its thicker or higher edge 40 facing into the vehicle. This bar forms a ramp that is positioned along the path followed by the detent bend 35 during closing of the door, so that the bend engages and rides up the ramp just before the door reaches the closed position (FIGS. 1 and 5), and passes the end 40 of the ramp as the door closing is completed. In this way the ramp deflects the detent, camming the spring out of its "relaxed" condition (FIG. 5) and into a "loaded" position (not shown) when the detent bend is at the top of the ramp. From that point, continued inward movement of the bend moves it past the thicker end or edge 40 of the ramp, permitting the loaded spring to snap the detent into engaged condition behind the ramp. The thicker end of the ramp thus constitutes an abutment or detent shoulder that serves to hold the detent bend in the recess behind the shoulder while the door is closed. Of course, the main holding force on the closed door is exerted by the conventional door latch, at the handle assembly 20, with the catch assembly of the present invention supplementing this action for the upper portion of the door.

As has been explained, the catch assembly 30 is designed to be effective in holding the top of the door closed only against fluttering forces, and to release the top of the door for normal opening of the door in response to an opening force exerted on the door handle by a user of the vehicle. For this purpose, the catch assembly 30 is designed to exert a predetermined maximum resistance to opening that is sufficient to resist the fluttering forces, and to be disengaged by a higher level of opening force exerted by a user. In the presently preferred catch 30, this is achieved by providing a reverse camming action between the detent bend 35 and the detent shoulder 40, herein utilizing the convex curvature of the bend to engage the shoulder in the latched condition and to slide over the shoulder into a disengaged position as the door is pulled open. This provides a secure, positive latching action when the elements are engaged, and a smooth and easy release in response to a predetermined opening force higher than the expected maximum fluttering forces.

The amount of holding force that will be exerted by the catch assembly 30 depends primarily on the stiffness of arm 34 of the leaf spring 31, as well as upon the design of the reverse-camming elements—the detent bend 35 and the shoulder 40. With the latter substantially perpendicular to the path of the detent, as shown, the curvature of the detent bend determines the level of force required to pull the detent bend over the shoulder. This is determined empirically for any given door and design, since precise calculations are not practical, either in determining the approximate maximum fluttering forces or in calculating the spring's holding force. As an example, the preferred embodiment of the invention uses a leaf of hard stainless spring steel, #302, that is 0.025 of an inch thick and 1.687 of an inch long, with an arm 34 that is 0.375 of an inch long. The bend has a detent radius of curvature of 0.125 of an inch, and the juncture of the detent bend with the arm is spaced from the fixed end of the spring a distance of about 1.7 inches. It should be noted that other dimensions and other types of catches may be used, the important characteristics of the catch being engagement as an incident to coming together, secure holding with a determinable force, and release in response to an opening force that exceeds the determinable force.

The optimum location for the catch assembly 30 is believed to be just below the leading upper corner of the door 17, near the upper end of the sloped upper portion 22 of the leading edge of the door, as shown in FIG. 2. For ease of mounting the two catch members 31 and 32 in properly aligned positions, a locator template 41 is provided to be positioned against corresponding locating lines 42 and 43 on the door 10, and the door frame 24, and the catch members 31 and 32 are positioned immediately below the template, as shown in FIG. 2. This facilitates location of the holes that are drilled for the screws 33 and 38 which secure the catch members in the selected positions. This assures that the catch piece 32 is positioned with the wedge-shaped bar 36 in the path of the detent bend 35 during closing of the door, and that the detent bend will snap into the recess behind the shoulder 40 when the door reaches the closed position. Subsequently, the holding force of the leaf spring 31 will resist outward movement of the upper portion of the door 17 with sufficient force to prevent fluttering in normal operation of the vehicle.

A positive locking feature can be incorporated in the catch assembly 30 to prevent opening in response to a direct outward pull on the top of the door, as would result from variations in outside air pressure. For this purpose, the effective thickness of the detent bend 35 can be made greater than the gap between the door edge 22 and the crossbar 36 when the door is closed (FIG. 5), so that the crossbar and the door edge will trap the detent bend during such direct outward movement. On the other hand, normal opening movement of the door about the hinge axis 29 will increase the gap sufficiently to permit the detent bend to clear the crossbar 36. For example, the gap between the crossbar and the closed door with the illustrative catch assembly can be set at 0.260 of an inch, and the crossbar can be made ³⁄₁₆ (0.3125) of an inch thick, while the detent bend is ⅛ (0.125) of an inch thick. This produces positive interference on passage of the bend through the gap, until it opens slightly as a result of the hinge action of the door.

From the foregoing, it will be seen that the present invention provides a simple and inexpensive solution to the problem of door flutter in vehicles having doors of the type described, without interfering with normal operation of the doors by the users. It also will be apparent that, while a specific preferred embodiment and mode of operation of the invention have been illustrated and described in detail, various modifications and changes may be made by those skilled in the art, within the spirit and scope of the invention.

I claim as my invention:

1. In combination with an upright vehicle door having a predetermined shape including a front side edge comprising a substantially straight lower portion and a rearwardly sloped upper portion to be subject to fluttering forces during vehicle operation, a door frame defining an opening of said predetermined shape sized to receive said door with a close fit, and a hinge between said straight lower portion of said door and the adjacent portion of said frame supporting the door for swinging between open and closed positions, the improvement comprising:

a catch assembly disposed between said door and said door frame above said straight lower portion and having:
a catch spring member including a yieldable detent; and
a catch member having a ramp and a detent recess at the end of the ramp;
one of said members being mounted in a preselected position on said door to follow a predetermined path during closing of the door and the other being mounted on said door frame and positioned along said path to engage said one member as the door swings into the closed position, and being operable when engaged to hold said door against outward movement in response to said fluttering forces; and
said members having opposed surfaces on said detent and ramp at said detent recess providing a reverse ramp for camming said detent out of said recess in response to an opening force on said door that is greater than the fluttering forces that are to be exerted during vehicle operation.

2. The combination of a vehicle door, a door frame, a hinge and a catch assembly as defined in claim 1 wherein said catch spring member is an elongated leaf spring having a fixed end and an arm portion that is inclined away from said fixed end and has an arcuate bend forming said detent, said arm portion being bendable for yielding of said detent, and said arcuate portion having one side that is engageable with said ramp during closing of said door and another side that provides said reverse ramp for camming the detent out of said recess.

3. The combination of a vehicle door, a door frame, a hinge and a catch assembly as defined in claim 1 wherein said catch member is a stationary catch plate including a wedge-shaped bar positioned to engage said yieldable detent as the door swings into the closed position, said ramp terminating in a raised end and a shoulder defining one side of said detent recess.

4. The combination of a vehicle door, a door frame, a hinge and a catch assembly as defined in claim 2 wherein said catch member is a stationary catch plate including a wedge-shaped bar positioned to engage said yieldable detent as the door swings into the closed position, said ramp terminating in a raised end and a shoulder defining one side of said detent recess.

5. The combination of a vehicle door, a door frame, a hinge and a catch assembly as defined in claim 1 wherein said catch assembly is positioned adjacent to the upper end of said rearwardly sloped upper portions of said door and said frame.

6. The combination of a vehicle door, a door frame, a hinge and a catch assembly as defined in claim 1 wherein said catch spring member is an elongated leaf spring having one end fixed to said front side edge of said door on said rearwardly sloped upper portion, and an arm portion that extends inwardly and is inclined away from said side edge with an arcuate bend in the free end portion of the spring forming said detent.

7. The combination of a vehicle door, a door frame, a hinge and a catch assembly as defined in claim 6 wherein said arcuate bend has a leading side that is positioned to engage said ramp during closing of said door and an opposite side forming the reverse ramp for camming said detent out of said recess during opening of the door.

8. The combination of a vehicle door, a door frame, a hinge and a catch assembly as defined in claim 1 wherein said catch spring member exerts a preselected approximate retention force on said catch member that is greater than a predetermined approximate fluttering force level to be encountered during normal operation of the vehicle.

9. In combination with a vehicle door of predetermined shape including a side edge comprising a straight lower portion and a sloped upper portion, a vehicle having a correspondingly shaped door opening receiving the door with a close fit, and a hinge between said lower portion and the vehicle mounting the door for swinging between open and closed positions, the improvement comprising a catch assembly disposed between the sloped upper portion of said door and the vehicle along to said sloped upper portion of said side edge, and having a first catch member secured to said door and a second catch member secured to said vehicle in position to be engaged by said first catch member as an incident to closing of the door, said members of said catch assembly being operable when engaged to hold the door releasably in the closed position and releasable in response to a predetermined opening force to release the door for movement to the open position.

10. The combination defined in claim 9 wherein said first catch member is an elongated leaf spring secured at one end to said door and having an arm that is inclined inwardly away from the door and an arcuate bend in its free end portion forming a detent, and said second catch member has a detent recess for receiving said detent in the closed position of the door.

11. The combination defined in claim 10 wherein said second member is a wedge-shaped bar forming a ramp for camming said detent and loading said spring as said door moves into the closed position and having a shoulder at the end of the ramp forming a detent abutment for holding the detent.

12. The combination defined in claim 11 wherein said arcuate bend and said shoulder are shaped and positioned to form a reverse ramp for camming said detent over said abutment in response to a predetermined opening force.

13. The combination defined in claim 11 wherein said shoulder and the closed door are spaced apart a distance less tan the effective thickness of the detent bend, to provide a positive block against direct outward movement of the door.

14. The method of preventing fluttering of a door of a vehicle in response to external forces during normal vehicle operation, the door having a substantially straight lower edge portion hinged to the vehicle in an opening shaped to receive the door with a close fit, and having a sloped upper edge portion above said straight lower portion, said method comprising the steps of:

determining the approximate level of the external forces to be encountered by the door during normal vehicle operation;

providing a catch assembly having first and second catch members that are engageable automatically as an incident to moving into contact with each other, and disengageable in response to a predetermined opening force that is greater than said approximate level of eternal forces;

positioning said catch assembly between said door edge and the vehicle on the upper portion of said door, and securing one of said members to the door and the other to the vehicle in positions to become engaged as an incident to closing of the door and to be disengaged in response to an opening force greater than said leverl of external forces.

15. The method defined in claim 13 wherein the positioning step includes the positioning of said catch assembly along said sloped edge.

16. The method defined in claim 13 wherein the positioning step includes the positioning of said catch assembly along said sloped edge near the upper end of said door.

* * * * *